(12) United States Patent
Kanna

(10) Patent No.: US 9,235,492 B2
(45) Date of Patent: Jan. 12, 2016

(54) CONTROL POLICY ADJUSTING APPARATUS, METHOD OF ADJUSTING CONTROL POLICY, AND PROGRAM

(75) Inventor: Yoshihiro Kanna, Tokyo (JP)

(73) Assignee: NEC CORPORATION, Tokyo (JP)

( * ) Notice: Subject to any disclaimer, the term of this patent is extended or adjusted under 35 U.S.C. 154(b) by 672 days.

(21) Appl. No.: 13/582,679

(22) PCT Filed: Jan. 21, 2011

(86) PCT No.: PCT/JP2011/000331
§ 371 (c)(1),
(2), (4) Date: Sep. 4, 2012

(87) PCT Pub. No.: WO2011/108185
PCT Pub. Date: Sep. 9, 2011

(65) Prior Publication Data
US 2013/0006569 A1    Jan. 3, 2013

(30) Foreign Application Priority Data
Mar. 5, 2010   (JP) .................................. 2010-048667

(51) Int. Cl.
   *G06F 11/34*    (2006.01)
(52) U.S. Cl.
   CPC ........ *G06F 11/3433* (2013.01); *G06F 11/3414* (2013.01); *G06F 11/3476* (2013.01); *G06F 2201/865* (2013.01); *G06F 2201/875* (2013.01)
(58) Field of Classification Search
   CPC .................................. G06F 9/50; G06F 11/34
   USPC ........................................................ 702/123
   See application file for complete search history.

(56) References Cited

U.S. PATENT DOCUMENTS

| | | | |
|---|---|---|---|
| 2003/0204619 A1* | 10/2003 | Bays .............................. | 709/238 |
| 2006/0224731 A1 | 10/2006 | Haga et al. | |
| 2008/0034093 A1 | 2/2008 | Sutou | |
| 2009/0210520 A1 | 8/2009 | Maeno | |

FOREIGN PATENT DOCUMENTS

| | | |
|---|---|---|
| JP | 2004-318454 A | 11/2004 |
| JP | 2006-197103 A | 7/2006 |
| JP | 2006-285316 A | 10/2006 |
| JP | 2008-033852 A | 2/2008 |
| WO | 2006/095506 A1 | 9/2006 |

* cited by examiner

*Primary Examiner* — Bryan Bui
(74) *Attorney, Agent, or Firm* — Sughrue Mion, PLLC

(57) ABSTRACT

A load information acquiring unit (230) sets load information based on the history that is acquired by a process history acquiring unit (220). A test period determining unit (240) sets a test period based on the load information. The test period is a period during which a test policy can be used. The test policy is a policy for a test out of control policies used by an information processing system (100). A system control unit (260) measures performance capability of the information processing system (100) under the test policy as a test result by testing the test policy under a production environment of the information processing system (100) by using the test policy instead of a practical policy that is actually used in the test period. A policy changing unit (270) changes the practical policy based on the test policy in a range in which the test result satisfies a reference.

6 Claims, 14 Drawing Sheets

FIG. 7

TOTAL TAT

| Web | | AP | DS | ARRIVAL RATE $\lambda$ | | | | | | | |
|---|---|---|---|---|---|---|---|---|---|---|---|
| A1 | B1 | A2 | B2 | 20 | 40 | 60 | 80 | 100 | 120 | 140 | 160 |
| 1 | 0 | | 36 LL | 1.0 | 100.0 | | | | | | |
| 0 | 1 | | 36 LL | 3.5 | 5.0 | 100.0 | | | | | |
| 2 | 0 | | 36 LL | 3.3 | 4.0 | 5.0 | 100.0 | | | | |
| 1 | 1 | | 36 LL | 3.2 | 3.6 | 4.5 | 7.0 | 100.0 | | | |
| 0 | 2 | | 36 LL | 3.2 | 3.5 | 4.0 | 5.0 | 8.0 | 100.0 | | |
| 2 | 1 | | 36 LL | 3.1 | 3.4 | 3.7 | 4.3 | 5.5 | 9.0 | 100.0 | |
| 1 | 2 | | 36 LL | 3.1 | 3.3 | 3.6 | 4.0 | 4.6 | 5.0 | 10.0 | 100.0 |
| 0 | 3 | | 36 LL | 3.1 | 3.2 | 3.5 | 3.3 | 4.2 | 5.0 | 6.5 | 11.0 |
| 2 | 2 | | 36 LL | 3.1 | 3.2 | 3.4 | 3.6 | 4.0 | 4.5 | 5.3 | 7.0 |
| 1 | 3 | | 36 LL | 3.1 | 3.2 | 3.3 | 3.5 | 3.8 | 4.2 | 4.7 | 6.6 |
| | | | | | | | | | | | |
| | 30 | | 36 LL | 3.0 | 3.0 | 3.0 | 3.0 | 3.0 | 3.0 | 3.0 | 3.0 |

FIG. 8

TOTAL TAT

| Web | | AP | | DS | ARRIVAL RATE λ | | | | | | | |
|---|---|---|---|---|---|---|---|---|---|---|---|---|
| A1 | B1 | A2 | B2 | | 20 | 40 | 60 | 80 | 100 | 120 | 140 | 160 |
| | 30 | 1 | 0 | LL | 5.0 | | | | | | | |
| | 30 | 0 | 1 | LL | 3.6 | 7.0 | | | | | | |
| | 30 | 2 | 0 | LL | 3.6 | 5.0 | 100.0 | | | | | |
| | 30 | 3 | 0 | LL | 3.2 | 3.6 | 5.0 | 11.0 | | | | |
| | 30 | 0 | 2 | LL | 3.2 | 3.6 | 4.5 | 7.0 | 100.0 | | | |
| | 30 | 2 | 1 | LL | 3.2 | 3.5 | 4.2 | 5.6 | 13.0 | | | |
| | 30 | 4 | 0 | LL | 3.2 | 3.5 | 4.0 | 5.0 | 6.0 | 100.0 | | |
| | 30 | 3 | 1 | LL | 3.1 | 3.4 | 3.7 | 4.3 | 5.5 | 9.0 | 100.0 | |
| | 30 | 0 | 3 | LL | 3.1 | 3.3 | 3.6 | 4.1 | 5.0 | 7.0 | 17.0 | |
| | 30 | 2 | 2 | LL | 3.1 | 3.3 | 3.5 | 4.0 | 4.5 | 6.0 | 10.0 | 100.0 |
| | 30 | 4 | 1 | LL | 3.1 | 3.3 | 3.5 | 3.8 | 4.4 | 5.4 | 7.8 | 19.0 |
| | 30 | 6 | 0 | LL | 3.1 | 3.2 | 3.5 | 3.6 | 4.2 | 5.0 | 6.5 | 11.6 |
| | 30 | 0 | 4 | LL | 3.1 | 3.2 | 3.4 | 3.6 | 4.0 | 4.5 | 5.3 | 7.0 |
| | | | | | | | | | | | | |
| | 30 | | 36 | LL | 3.0 | 3.0 | 3.0 | 3.0 | 3.0 | 3.0 | 3.0 | 3.0 |

FIG. 9

TOTAL TAT

| Web | | AP | | DS | ARRIVAL RATE λ | | | | | | | |
|---|---|---|---|---|---|---|---|---|---|---|---|---|
| A1 | B1 | A2 | B2 | | 20 | 40 | 60 | 80 | 100 | 120 | 140 | 160 |
| | 30 | | 36 | SS | 3.3 | 4.0 | 6.0 | 100.0 | | | | |
| | 30 | | 36 | S | 3.2 | 3.5 | 4.0 | 5.0 | 6.0 | 100.0 | | |
| | 30 | | 36 | M | 3.1 | 3.21 | 3.4 | 3.6 | 4.0 | 4.5 | 5.3 | 7.0 |
| | 30 | | 36 | L | 3.0 | 3.1 | 3.2 | 3.3 | 3.5 | 3.6 | 3.8 | 4.1 |
| | 30 | | 36 | LL | 3.0 | 3.0 | 3.0 | 3.0 | 3.0 | 3.0 | 3.0 | 3.0 |

FIG. 10

| Web | | AP | | DS | ACTUAL PROCESSING TIME | WAITING TIME | | | | |
|---|---|---|---|---|---|---|---|---|---|---|
| A1 | B1 | A2 | B2 | | | Web | AP | DS | | ESTIMATED TAT |
| 1 | 1 | 3 | 1 | L | 3.00 | 4.80 | 1.55 | 0.35 | | 9.72 |
| 1 | 1 | 0 | 3 | M | 3.00 | 4.80 | 1.32 | 0.72 | | 9.84 |
| 0 | 2 | 2 | 1 | M | 3.00 | 2.40 | 3.12 | 0.72 | | 9.24 |
| 0 | 2 | 3 | 1 | S | 3.00 | 2.40 | 1.55 | 2.40 | | 9.36 |
| 2 | 1 | 0 | 2 | L | 3.00 | 1.55 | 4.80 | 0.36 | | 9.72 |
| 2 | 1 | 4 | 0 | S | 3.00 | 1.55 | 2.40 | 2.40 | | 9.36 |
| 1 | 2 | 0 | 2 | M | 3.00 | 1.20 | 4.80 | 0.72 | | 9.72 |
| 1 | 2 | 2 | 1 | S | 3.00 | 1.20 | 3.12 | 2.40 | | 9.72 |

FIG. 11

REQUEST ARRIVAL RATE IS DENOTED BY $\lambda$
APPLICATION SERVER WILL BE DENOTED BY AP SERVER, AND DATABASE SERVER WILL BE DENOTED BY DB SERVER

```
IF 0 < λ ≦ 20, WEB SERVER = A1, AP SERVER = A2, AND DB SERVER = SS
IF 20 < λ ≦ 40, WEB SERVER = B1, AP SERVER = A2*2, AND DB SERVER = SS
IF 40 < λ ≦ 60, WEB SERVER = A1+B1, AP SERVER = B2*2, AND DB SERVER = S
IF 60 < λ ≦ 80, WEB SERVER = B1*2, AP SERVER = A2*2+B2, AND DB SERVER = M
IF 80 < λ ≦ 100, WEB SERVER = A1*2+B1, AP SERVER = A2*3+B2, AND DB SERVER = M
  :
  :
```

FIG. 12

[WEB SERVER PERFORMANCE MEASURING CONTROL POLICY]

IF $40 < \lambda \leq 60$, WEB SERVER = A1+B1, AP SERVER = B2*2, AND DB SERVER = S
IF $60 < \lambda \leq 80$, WEB SERVER = A1+B1, AP SERVER = A2*3+B2, AND DB SERVER = L
IF $80 < \lambda \leq 100$, WEB SERVER = A1*2+B1, AP SERVER = A2*3+B2, AND DB SERVER = M
:

[APPLICATION SERVER PERFORMANCE MEASURING CONTROL POLICY]

IF $40 < \lambda \leq 60$, WEB SERVER = A1+B1, AP SERVER = B2*2, AND DB SERVER = S
IF $60 < \lambda \leq 80$, WEB SERVER = A1*2+B1, AP SERVER = B2*2, AND DB SERVER = L
IF $80 < \lambda \leq 100$, WEB SERVER = A1*2+B1, AP SERVER = A2*3+B2, AND DB SERVER = M
:

[DATABASE SERVER PERFORMANCE MEASURING CONTROL POLICY]

IF $40 < \lambda \leq 60$, WEB SERVER = A1+B1, AP SERVER = B2*2, AND DB SERVER = S
IF $60 < \lambda \leq 80$, WEB SERVER = A1+B1*2, AP SERVER = A2*2+B2, AND DB SERVER = S
IF $80 < \lambda \leq 100$, WEB SERVER = A1*2+B1, AP SERVER = A2*3+B2, AND DB SERVER = M
:

FIG. 13

RESULT OF APPLYING WEB SERVER PERFORMANCE MEASURING POLICY

|  | $\lambda$ | | | | | |
|---|---|---|---|---|---|---|
|  | 55 | 60 | 65 | 70 | 75 | 80 |
| WEB SERVER WAITING TIME | 1.2 | 1.6 | 1.9 | 2.3 | 3 | 3.9 |
| AP SERVER WAITING TIME | 1.2 | 1.5 | 0.8 | 1 | 1.1 | 1.3 |
| DB SERVER WAITING TIME | 0.9 | 1.2 | 0.2 | 0.3 | 0.3 | 0.3 |
| TAT | 6.3 | 7.3 | 5.9 | 6.6 | 7.4 | 8.5 |

RESULT OF APPLYING AP SERVER PERFORMANCE MEASURING POLICY

|  | $\lambda$ | | | | | |
|---|---|---|---|---|---|---|
|  | 55 | 60 | 65 | 70 | 75 | 80 |
| WEB SERVER WAITING TIME | 1.2 | 1.6 | 0.9 | 1 | 1.2 | 1.4 |
| AP SERVER WAITING TIME | 1.2 | 1.5 | 1.8 | 2.0 | 2.9 | 3.9 |
| DB SERVER WAITING TIME | 0.9 | 1.2 | 0.2 | 0.3 | 0.3 | 0.3 |
| TAT | 6.3 | 7.3 | 5.9 | 8.6 | 7.4 | 8.5 |

RESULT OF APPLYING DB SERVER PERFORMANCE MEASURING POLICY

|  | $\lambda$ | | | | | |
|---|---|---|---|---|---|---|
|  | 55 | 60 | 65 | 70 | 75 | 80 |
| WEB SERVER WAITING TIME | 1.2 | 1.6 | 0.7 | 0.8 | 0.9 | 1 |
| AP SERVER WAITING TIME | 1.2 | 1.5 | 1.4 | 1.7 | 2.1 | 2.6 |
| DB SERVER WAITING TIME | 0.9 | 1.2 | 1.8 | 1.5 | 1.9 | 2.3 |
| TAT | 6.3 | 7.3 | 5.4 | 7 | 7.8 | 8.9 |

|  | $\lambda$ | | | | | |
|---|---|---|---|---|---|---|
|  | 55 | 60 | 65 | 70 | 75 | 80 |
| WEB SERVER WAITING TIME | 1.2 | 1.6 | 1.9 | 2.3 | 3 | 3.9 |
| AP SERVER WAITING TIME | 1.2 | 1.5 | 0.8 | 2.3 | 2.9 | 3.9 |
| DB SERVER WAITING TIME | 0.9 | 1.2 | 1.3 | 1.5 | 1.8 | 2.3 |
| ESTIMATED TAT IN A CONFIGURATION AT $\lambda = 60$ | 6.3 | 7.3 | 8 | 9.1 | 10.7 | 13.1 |

FIG. 14

```
IF 0 < λ ≤ 20, WEB SERVER = A1, AP SERVER = A2, AND DB SERVER = SS
IF 20 < λ ≤ 40, WEB SERVER = B1, AP SERVER = A2*2, AND DB SERVER = SS
IF 40 < λ ≤ 70, WEB SERVER = A1+B1, AP SERVER = B2*2, AND DB SERVER = S
IF 70 < λ ≤ 80, WEB SERVER = B1*2, AP SERVER = A2*2+B2, AND DB SERVER = M
IF 80 < λ ≤ 100, WEB SERVER = A1*2+B1, AP SERVER = A2*3+B2, AND DB SERVER = M
  ⋮
  ⋮
```

CONTROL POLICY ADJUSTING APPARATUS, METHOD OF ADJUSTING CONTROL POLICY, AND PROGRAM

CROSS REFERENCE TO RELATED APPLICATIONS

This application is a National Stage of International Application No. PCT/JP2011/000331 filed Jan. 21, 2011, claiming priority based on Japanese Patent Application No. 2010-048667 filed Mar. 5, 2010, the contents of all of which are incorporated herein by reference in their entirety.

TECHNICAL FIELD

The present invention relates to a control policy adjusting apparatus that adjusts a control policy of an information processing system, a method of adjusting a control policy, and a program.

BACKGROUND ART

In a general system control technique using a control policy, a test environment that is as close as possible to a production environment is built, the control policy of a production environment is determined based on the evaluation result using the test environment, and the control policy is applied to the production environment, thereby achieving system control. According to such a method, although a test environment is prepared assuming a usage pattern of the system at the time of a production, the test environment is different from the usage pattern during production, and accordingly, an accurate test may not be performed. An example of a system for solving such a problem is disclosed in Patent Document 1.

In the system disclosed in Patent Document 1, a load that is based on a measured access pattern in a time period during which the access frequency to a server is low is applied to the server while the access frequency is increased. Then, the access frequency and a performance value of the server are monitored. Then, the access frequency at which the measured performance value reaches a required value (required performance) is recorded as the limit performance. The recorded performance value is used for operating the server.

In addition, in the description disclosed in Patent Document 2, a technique for performing a test under a production environment in an intrusion prevention system (IPS) is disclosed.

RELATED DOCUMENT

Patent Document

[Patent Document 1] Japanese Laid-open Patent Publication NO. 2004-318454
[Patent Document 2] Japanese Laid-open Patent Publication NO. 2006-197103

DISCLOSURE OF THE INVENTION

In the technique disclosed in Patent Document 1, since the access pattern is not the access pattern during production, the accuracy is lower than that of a case where a control policy is determined by using a load that occurs in production. The technique disclosed in Patent Document 2 uses the features of the IPS, and accordingly, it cannot be developed into a general system. As above, it is difficult to test a control policy under the production environment in a general system.

An object of the present invention is to provide a control policy adjusting apparatus, a method of adjusting a control policy, and a program that can test a control policy during production in a general system.

According to the present invention, there is provided a control policy adjusting apparatus including: a process history acquiring unit that acquires a history of processing performed by an information processing system; a load information acquiring unit that sets load information representing a period dependency of the amount of processing required for the information processing system based on the history that is acquired by the process history acquiring unit; a test period determining unit that sets a test period that is a period during which a test policy which is a policy for a test can be used out of control policies performed by the information processing system based on the load information; a system control unit that measures performance capability of the information processing system under the test policy as a test result by testing the test policy under a production environment of the information processing system by using the test policy instead of a practical policy that is actually used in the test period; and a policy changing unit that changes the practical policy based on the test policy in a range in which the test result satisfies a reference.

According to the present invention, there is provided a method of adjusting a control policy including: acquiring history of processing performed by an information processing system by using a computer; setting load information that represents a period dependency of the amount of processing required for the information processing system based on the acquired history by using the computer; setting a test period that is a period during which a test policy which is a policy for a test can be used out of control policies performed by the information processing system based on the load information by using the computer; measuring performance capability of the information processing system under the test policy as a test result by testing the test policy under a production environment of the information processing system by using the test policy instead of a practical policy that is actually used in the test period by using the computer; and changing the practical policy based on the test policy in a range in which the test result satisfies a reference by using the computer.

According to the present invention, there is provided a program that causes a computer to function as a control policy changing apparatus that changes a control policy of an information processing system, the program causing the computer implement functions of: setting load information that represents a period dependency of the amount of processing required for the information processing system based on the acquired history; setting a test period that is a period during which a test policy which is a policy for a test can be used out of control policies performed by the information processing system based on the load information; measuring performance capability of the information processing system under the test policy as a test result by testing the test policy under a production environment of the information processing system by using the test policy instead of a practical policy that is actually used in the test period; and changing the practical policy based on the test policy in a range in which the test result satisfies a reference.

ADVANTAGES OF PRESENT INVENTION

According to the present invention, a control policy can be tested in a production of a general system.

BRIEF DESCRIPTION OF THE DRAWINGS

The above and other objects, features, and advantages will become more apparent by preferred embodiments described below and the following drawings accompanied therewith.

FIG. 7 is a table that illustrates an example of measurements of TATs.

FIG. 8 is a table that illustrates an example of measurements of TATs.

FIG. 9 is a table that illustrates an example of measurements of TATs.

FIG. 10 is a diagram that illustrates an example of the configuration of a control policy when a required arrival rate is 80.

FIG. 11 is a diagram that illustrates an example of a control policy that can be used as a practical policy.

FIG. 12 is a diagram that illustrates an example of a performance measurement policy group (test policy group).

FIG. 13 is a table that illustrates an example of a performance measurement result.

FIG. 14 is a diagram that illustrates an example of a practical policy after change.

DESCRIPTION OF EMBODIMENTS

Figure 1:
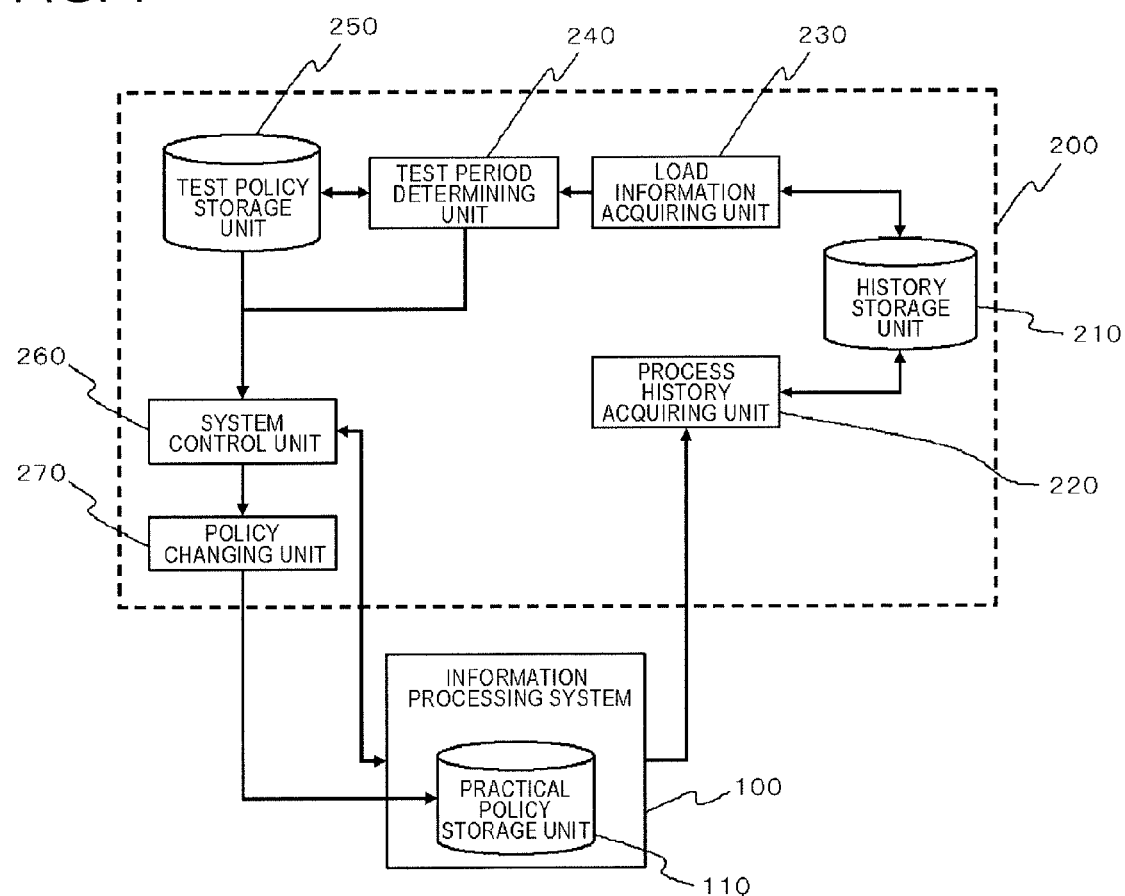
FIG. 1 is a block diagram that illustrates the configuration of a control policy adjusting apparatus according to a first embodiment.

Hereinafter, embodiments of the present invention will be described with reference to the drawings. Like reference numerals in the drawings denote like elements, and thus their description will not be repeated as is appropriate.

FIG. 1 is a block diagram that illustrates the configuration of a control policy adjusting apparatus 200 according to a first embodiment. The control policy adjusting apparatus 200 is an apparatus that adjusts the control policy of an information processing system 100 to an appropriate state and includes a process history acquiring unit 220, a load information acquiring unit 230, a test period determining unit 240, a system control unit 260, and a policy changing unit 270. The process history acquiring unit 220 acquires the history of the processes performed by the information processing system 100. The load information acquiring unit 230 sets load information that represents the dependency of the processing amount required for the information processing system 100 on a period based on the history that is acquired by the process history acquiring unit 220. The test period determining unit 240 sets a test period based on the load information. The test period is a period during which a test policy can be used. The test policy is a policy used for a test out of control policies used by the information processing system 100. The system control unit 260 tests the test policy under the production environments of the information processing system 100 by using the test policy instead of a practical policy that is actually used during the test period, thereby measuring the processing capability of the information processing system 100 under the test policy as a test result. The policy changing unit 270 changes the practical policy based on the test policy within a range in which the test result satisfies a reference.

Described in detail, the process history acquiring unit 220 acquires, for example, a process log that is generated by the information processing system 100 as the history of the process from the information processing system 100 through a batch process. The control policy adjusting apparatus 200 includes a history storage unit 210, and the process history acquiring unit 220 stores acquired history in the history storage unit 210. The load information acquiring unit 230 reads out the history from the history storage unit 210 and calculates information that represents the dependency (for example, dependence on time) of the amount of the process per unit time on the period, which is performed by the information processing system 100, as load information. The test period determining unit 240 sets a period (for example, time) during which the amount of the process per unit time satisfies the reference as a test period (for example, test time).

In this embodiment, the control policy adjusting apparatus 200 further includes a test policy storage unit 250. The test policy storage unit 250 stores the test policy. For example, in a case where a plurality of test periods is set in accordance with the amount of processing, the test policy storage unit 250 stores the plurality of test policies in association with the amounts of processing per unit time in which each test policy is used. In such a case, the test period determining unit 240 reads out the amount of processing per unit time that corresponds to the test policy as a test target from the test policy storage unit 250 and sets a test period based on the read-out amount of processing per unit time and the load information.

Then, the system control unit 260 reads out a test policy as a test target from the test policy storage unit 250 and sets the read-out test policy to the information processing system 100. Then, the system control unit 260 acquires a log of the processing using the test policy from the information processing system 100. The policy changing unit 270 changes the practical policy of the information processing system 100 based on the processing log that is acquired by the system control unit 260. The information processing system 100 stores the practical policy in the practical policy storage unit 110. Then, the policy changing unit 270 changes the practical policy that is stored in the practical policy storage unit 110.

In FIG. 1, the configuration of parts that are not related to the essence of the present invention is not illustrated. Each constituent element of the control policy adjusting apparatus 200 illustrated in FIG. 1 represents not a configuration of a hardware unit but a block of a functional unit. Each constituent element of the control policy adjusting apparatus 200 is implemented by an arbitrary combination of hardware and software using a CPU of an arbitrary computer, a memory, a program that is loaded into the memory and implements a constituent element that is illustrated in the figure, a storage unit such as a hard disk that stores the program, and an interface for a network connection as main elements. In addition, it is understood by those skilled in the art that there are various modified examples of the implementation method thereof and the apparatus.

Figure 2:
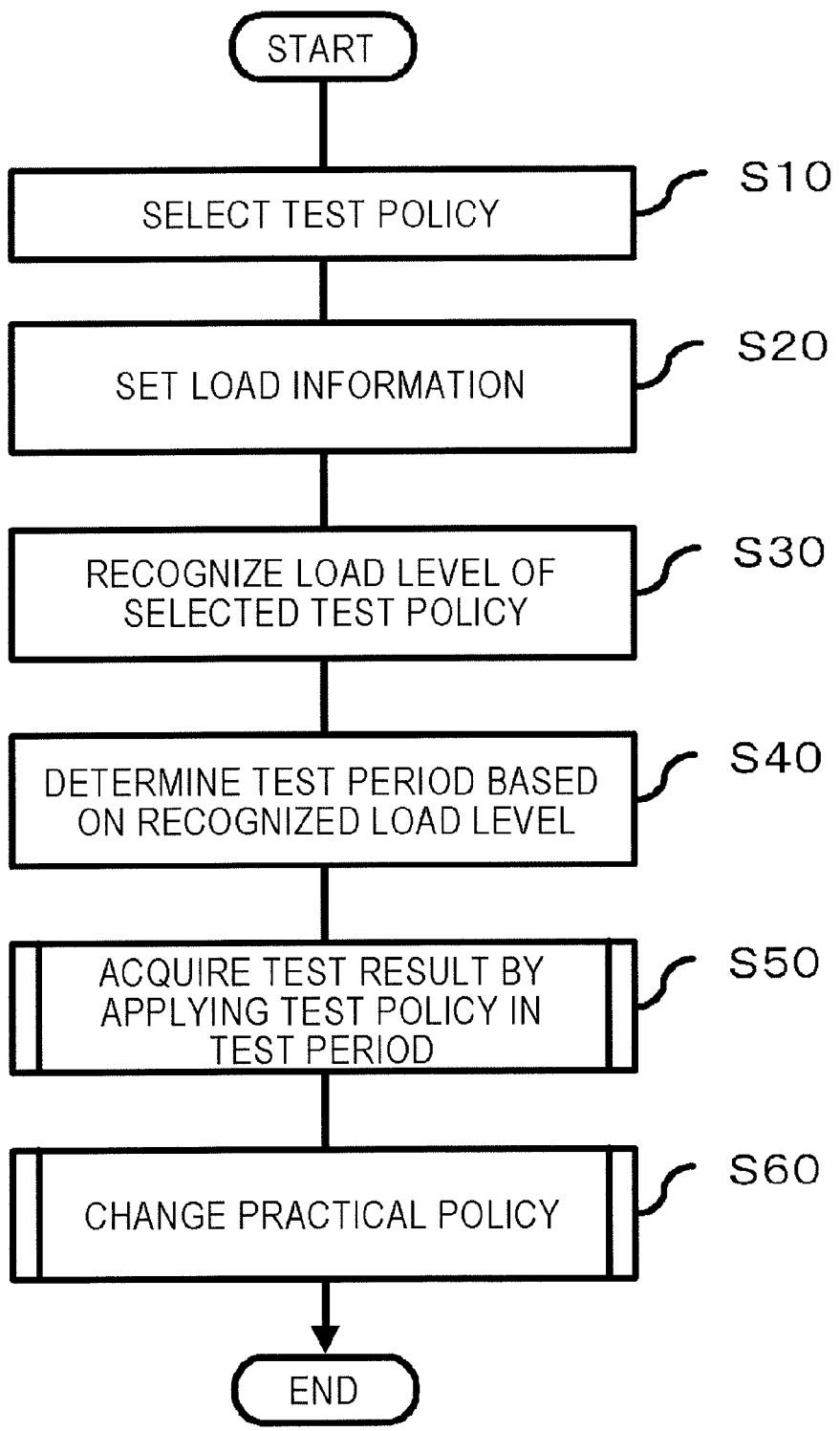
FIG. 2 is a flowchart that illustrates the operation of the control policy adjusting apparatus.

FIG. 2 is a flowchart that illustrates the operation of the control policy adjusting apparatus 200. The process illustrated in the figure is an operation performed when the control policy adjusting apparatus 200 adjusts the control policy. Separately from the process illustrated in the figure, the process history acquiring unit 220 of the control policy adjusting apparatus 200 acquires a process log that is generated by the information processing system 100 from the information processing system 100 through a batch process and stores the processing log in the history storage unit 210.

First, information used for specifying a test policy to be tested is input to the control policy testing apparatus 200. In the test policy storage unit 250, a flag corresponding to a specified test policy can be set. This flag represents that the test policy is a test target (Step S10).

The load information acquiring unit 230 reads out the process history of the information processing system 100 from the history storage unit 210 and calculates information that represents the period dependancy of the amount of processing per unit time, which is performed by the information processing system 100, as load information based on the read-out process history (Step S20).

In addition, the test period determining unit 240 recognize a test policy of which the flag is set from the test policy storage unit 250 and reads out the amount of processing per unit time (in other words, the load level) that corresponds to the test policy from the test policy storage unit 250 so as to be recognized (Step S30). Then, the test period determining unit 240 recognizes a period during which a load having the same level as the recognized load level is applied to the information processing system 100 based on the load information and sets the recognized period as a test period (Step S40).

Then, when it is the test period, the system control unit 260 applies the test policy to the information processing system 100 and tests the test policy. The system control unit 260 acquires a process log of the information processing system 100 during the application of the test policy as a test result (Step S50).

Thereafter, the policy changing unit 270 changes the practical policy based on the test result that has been acquired by the system control unit 260 (Step S60).

Figure 3:
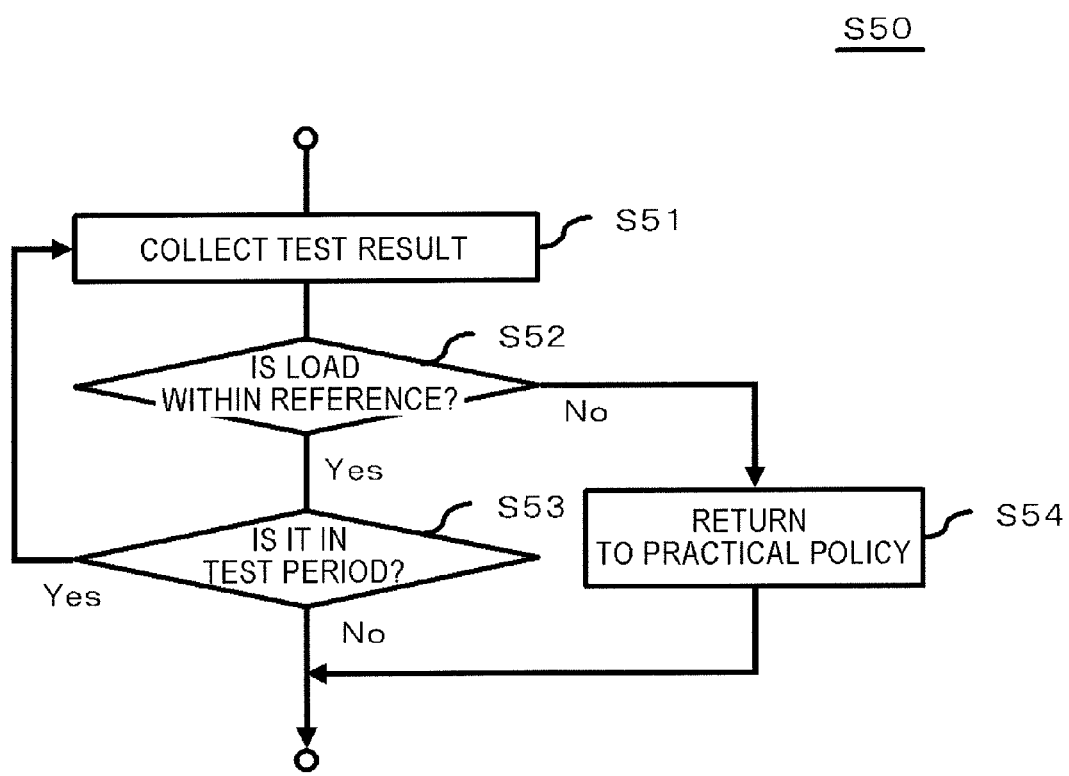
FIG. 3 is a flowchart that illustrates a detailed example of Step S50 shown in FIG. 2.

FIG. 3 is a flowchart that illustrates a detailed example of Step S50 shown in FIG. 2. Every time processing is performed, the system control unit 260 collects a process log as a test result (Step S51). Then, the system control unit 260 continuously monitors whether or not the amount of processing (in other words, the load level) that is required for the information processing system 100 is within the range of the reference based on the test result (Step S52). Here, the reference, for example, is a value acquired by multiplying the amount of processing corresponding to the test policy that is currently used by a reference value. In a case where the amount of processing that is required for the information processing system 100 exceeds the reference (No in Step S52), the system control unit 260 stops the operating of the test policy and returns the policy to the practical policy that has been used before the application of the test policy (Step S54).

Then, until the test period ends (Yes in Step S53), the system control unit 260 continues the above-described process.

Figure 4:
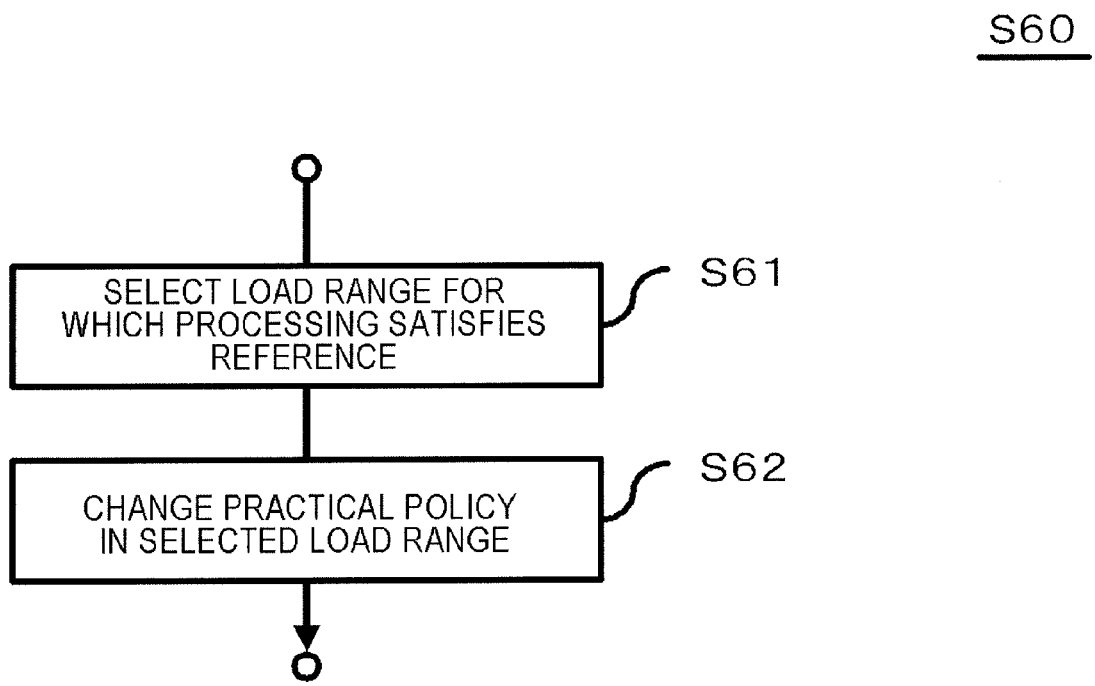
FIG. 4 is a flowchart that illustrates a detailed example of Step S60 shown in FIG. 2.

FIG. 4 is a flowchart that illustrates a detailed example of Step S60 shown in FIG. 2. The policy changing unit 270 calculates the range of the load in which the processing satisfies the reference, in other words, the amount of processing per unit time based on the test result. In a case where the amount of processing that is required for the information processing system 100 increases, a time relating to the processing per unit amount is lengthened. In a case where the time required for the processing per unit amount as the above-described reference has been determined, the policy changing unit 270 calculates the upper limit of the mount of processing per unit time that is necessary for the time required for the processing per unit amount to be within the reference based on the process log as a test result (Step S61). Then, the policy changing unit 270 replaces the practical policy in the selected load range with the control policy that is used as the test policy (Step S62).

Next, the operation and the advantage of this embodiment will be described. According to this embodiment, the test period determining unit 240 of the control policy adjusting apparatus 200 selects a period during which the test condition of the test policy is satisfied as a test period based on the process history of the information processing system 100. Then, the system control unit 260 uses the test policy as a control policy of the information processing system 100 during the test period. Accordingly, even in a case where the information processing system 100 is a general system, the control policy can be tested through an actual operation.

In addition, while the test policy is applied, the system control unit 260 monitors the load on the information processing system 100. When the load exceeds the reference, the application of the test policy as the control policy of the information processing system 100 is stopped, and the policy is returned to the practical policy as the control policy that had been actually used. Accordingly, the generation of the influence on the actual operation of the information processing system 100 due to the test of the test policy can be suppressed.

Figure 5:
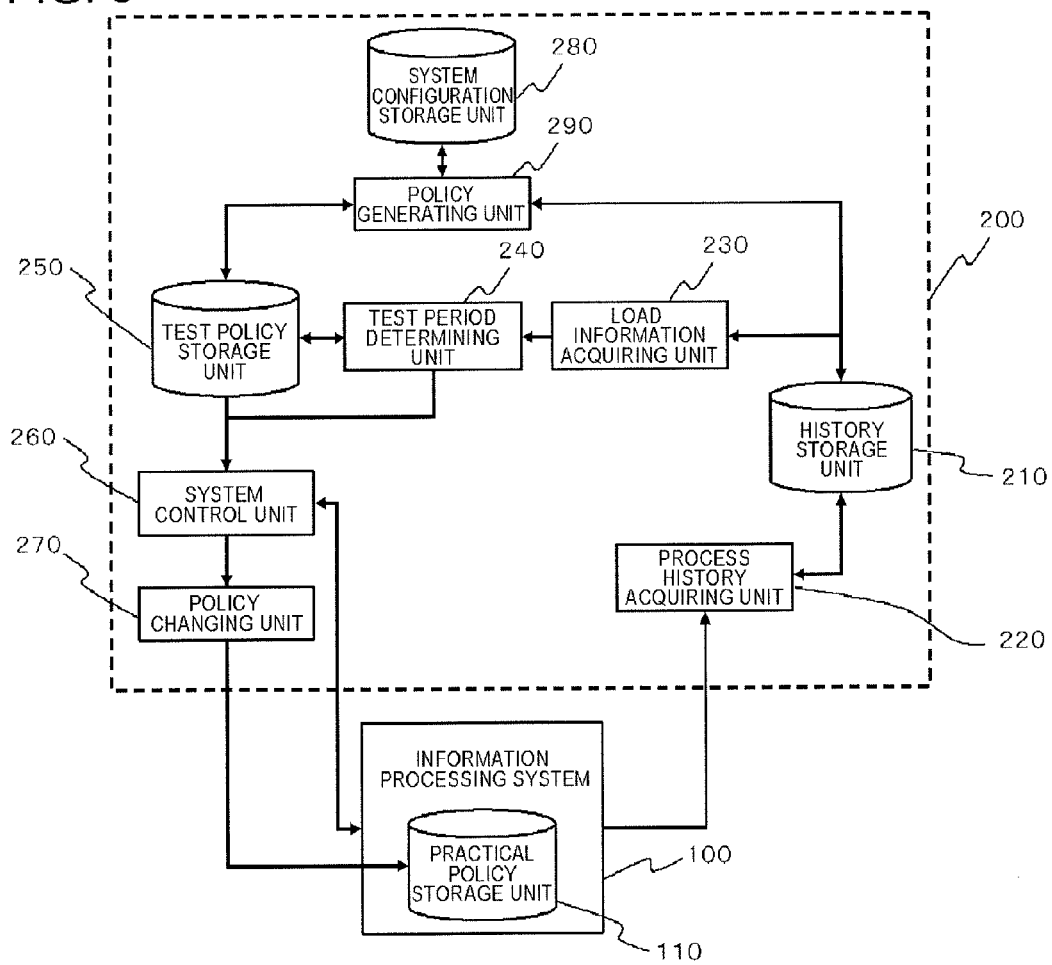
FIG. 5 is a block diagram that illustrates the configuration of a control policy adjusting apparatus according to a second embodiment.
Figure 6:
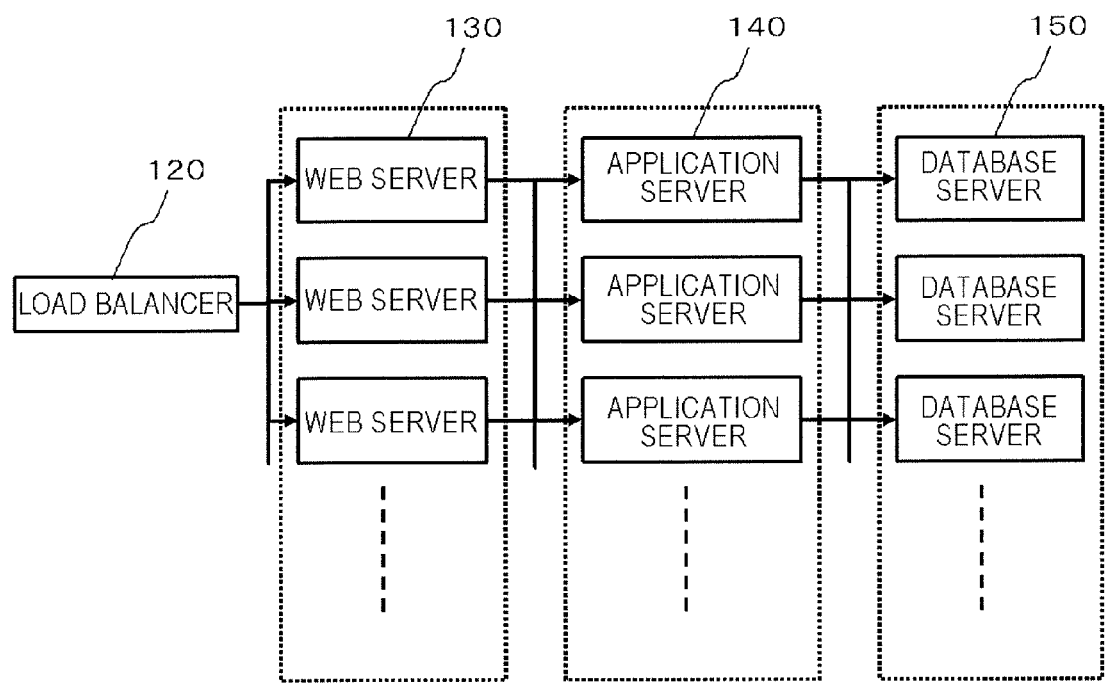
FIG. 6 is a block diagram that illustrates the configuration of an information processing system shown in FIG. 5.

FIG. 5 is a block diagram that illustrates the configuration of a control policy adjusting apparatus 200 according to a second embodiment, and FIG. 6 is a block diagram that illustrates the configuration of an information processing system 100 shown in FIG. 5. The control policy adjusting apparatus 200 that is used in this embodiment is similar to that of the example illustrated in FIG. 1 except for the installation of a system configuration storage unit 280 and a policy generating unit 290. The information processing system 100 according to this embodiment is a web system of a three-layer type and includes a load balancer 120, a plurality of web servers 130, a plurality of application servers 140, and a plurality of database servers 150. The plurality of web servers 130 performs processing in parallel with one another, the plurality of application servers 140 performs processing in parallel with one another, and the plurality of database servers 150 performs processing in parallel. The control policy sets the numbers of the web servers 130, the application servers 140, and the database servers 150 to be operated.

The load balancer 120 receives a process request from a plurality of client terminals (not illustrated in the figure) and assigns the process to one of the web servers 130. The web server 130 interprets a request from a client terminal and notifies the client terminal of the processing result. The application server 140 processes the request interpreted by the web server 130. The database server 150 maintains data and returns the maintained data in accordance with a request from the application server 140. This information processing system 100 can be controlled by the control policy. The number of servers that configure the web servers 130 and the application servers 140 change based on conditions determined by the control policy. On the other hand, the performance of servers that configure the database servers 150 changes based on the conditions determined by the control policy. The configuration of the information processing system 100 is stored in the system configuration storage unit 280.

In addition, the performance requirements for the information processing system 100 is set, and a TAT (a time until a user is notified of a process result after a request from the user is received) is assumed to be set to be within ten seconds in the information processing system 100.

Before the information processing system 100 is actually operated, a test environment of the information processing system 100 is configured, and the performance of the information processing system 100 under the test environment is measured. FIGS. 7, 8, and 9 illustrate the results of prior performance measurements. In FIG. 7, while the performance of the application server 140 and the database server 150 is fixed to a maximum, the configuration and the number of servers that are allocated to the web servers 130 are variously changed, and the request arrival rate (an average of the number of arrived requests per minute) of requests from a user is variously changed, TATs measured at that time are illustrated. Similarly, FIG. 8 illustrates measurement results of TATs in a case where the performance of the web server 130 and the database server 150 is fixed to a maximum, and the configuration and the number of servers that are allocated to the application servers 140 are variously changed, and FIG. 9 illustrates measurement results of TATs in a case where the performance of the web server 130 and the application server 140 is fixed to a maximum, and the performance of servers allocated to the database servers 150 is variously changed. By referring to such measurement results, when the performance of the server is set to the maximum, the TAT is 3.0, and accordingly, it can be understood that a minimum of 3.0 seconds is necessary for the processing regardless of the performance of the server, and any portion exceeding 3.0 seconds in the measurement results represented in FIGS. 7, 8, and 9 is a process delay due to the server load.

Based on such measurement results, for each request arrival rate, the configuration, the numbers, and the performance of servers to be allocated to the web servers 130, the application servers 140, and the database servers 150 can be estimated. For example, at the time of a request arrival rate of 80, in a case where one A1-type server and one B1-type server are allocated to the web servers 130, it can be estimated that a process delay of 4.0 seconds will occur in the web servers 130. Similarly, for example, in a case where three A2-type servers and one B2-type server are allocated to the application servers 140, it can be estimated that a process delay of 1.3 seconds will occur in the application servers 140, and it can be estimated that a process delay of 0.3 seconds will occur in the database server 150 in a case where the performance of the database server 150 is set to level L. In a case where the information processing system 100 is configured by combining these, it can be estimated that a total process delay of 5.6 seconds will occur. Even in a case where a margin of 20% is set in consideration of an estimate according to the measurement results under a test environment, the process delay is 6.72 seconds, and 9.72 seconds is required by adding the 3.0 seconds required for the process thereto, whereby it can be stated that performance requirements can be satisfied in which the TAT is within 10 seconds.

By using the same technique, various configurations of the information processing system 100 can be considered. An example of the configuration at a time when the request arrival rate is 80 is illustrated in FIG. 10. From among such configurations, one configuration that is applied to the control policy as a test policy is selected. Here, a configuration located third from the top in which the process delay time is relatively uniform is assumed to be selected. In addition, the configuration is selected as such at a time when the request arrival rate is 20, 40, 60, or the like. By combining these, a control policy (test policy) in which different policies are set in accordance with the request arrival rate is generated. An example of the configured control policy is illustrated in FIG. 11.

Although FIG. 11 is one example of the control policy, there are a plurality of configuration examples at a time when the request arrival rate is 80 in FIG. 10, it is possible to generate a plurality of control policies from the measurement results of FIGS. 7, 8, and 9. The above-described process is performed by the policy generating unit 290. Then such a control policy group is stored in the test policy storage unit 250.

After the control policy group is stored in the test policy storage unit 250, a practical policy is set by the practical policy storage unit 110. For example, this setting is performed by the policy changing unit 270. Here, it is assumed that the policy illustrated in FIG. 11 is set. Thereafter, an actual operation is started, and, by performing the same process as that of the flow illustrated in FIG. 3, monitoring of the information processing system 100 is performed. By continuously performing the monitoring, the performance characteristics of the information processing system 100 under the production environment can be acquired. For example, when the control policy represented in FIG. 11 is applied at the time of a request arrival rate of 60, it is assumed to be understood that the performance delay in the web server 130 is 1.6 seconds, the performance delay in the application server 140 is 1.5 seconds, and the performance delay in the database server 150 is 1.2 seconds. At this time, since the TAT of the information processing system 100 is 7.3 seconds, which is sufficiently below 10 seconds as the performance requirements, it is understood that the performance requirements can be satisfied with the control policy at a time when the request arrival rate is 60 even in a state where the request arrival rate exceeds 60.

However, in the state in which the control policy represented in FIG. 11 is applied, another configuration is applied when the request arrival rate exceeds 60, and accordingly, the characteristics cannot be known when the configuration at the time when the request arrival rate is 60 is applied to a state in which the request arrival rate exceeds 60. In addition, in the measurement result under the test environment, in a case where the configuration at the time when the request arrival rate is 60 is applied to the state in which the request arrival rate exceeds 60, a result is acquired in which there is a possibility that the performance requirements cannot be satisfied, and accordingly, it cannot be assured that the performance requirements can be satisfied by applying the configuration of a case where the request arrival rate is 60 to a state in which the request arrival rate exceeds 60 in the production environment in this state.

Accordingly, by selecting a control policy that is appropriate for a performance measurement from among a plurality of policies stored in the test policy storage unit 250 and applying the selected control policy to the information processing system 100 in a period that is appropriate for the performance measurement, performance characteristic information under the production environment is acquired. First, in accordance with the flow illustrated in FIG. 2, a period that is appropriate for the performance measurement is selected. Here, in order to perform a performance measurement in the state in which the request arrival rate exceeds 60, a period having a high possibility of being stable in the range of a request arrival rate of 60 to 80 is selected. In addition, a test policy used for measuring the performance of the web server is selected. While the configuration of this test policy for a range other than the range of a request arrival rate of 60 to 80 is the same as that of the control policy that has been applied until now, in the configuration thereof for a request arrival rate of 60 to 80, only one of the web server 130, the application server 140, and the database server 150 is the same as that in the configuration for a request arrival rate of 40 to 60. More specifically, a configuration, in which the configuration of the web server 130 is the same, illustrated on the top in FIG. 10, a configuration, in which the configuration of the application server group is the same, illustrated fifth in FIG. 10, and a configuration, in which the configuration of the database server group is the same, illustrated at the bottom in FIG. 10 is applicable thereto. A performance measuring policy group selected by using such a method is illustrated in FIG. 12. As illustrated in FIG. 12, in a test policy that is used for measuring the performance of the web server, the configuration of the web server 130 at a time when the request arrival rate is 40 to 60 and the configuration of the web server 130 at a time when the request arrival rate is 60 to 80 are the same.

Similarly, in a test policy that is used for measuring the performance of the application server, the configuration of the application server 140 is the same between a case where the request arrival rate is 40 to 60 and a case where the request arrival rate is 60 to 80. And, in a test policy that is used for measuring the performance of the database server, the configuration of the database server 150 is the same between a case where the request arrival rate is 40 to 60 and a case where the request arrival rate is 60 to 80.

By applying the test policy used for measuring the performance to the system control unit 260, the performance measurement is performed. As a result, it is assumed that the result of the performance measurement as illustrated in FIG. 13 is acquired. By referring to FIG. 13, in a case where the configuration at a time when the request arrival rate is 60 is applied to that at a time when the request arrival rate is 70, the process delay of the web server 130 is 2.3 seconds, the process delay of the application server 140 is 2.3 seconds, and the process delay of the database server 150 is 1.5 seconds, whereby the TAT is estimated to be 9.1 seconds. On the other hand, in a case where the configuration at a time when the request arrival rate is 60 is applied to that at a time when the request arrival rate is 75, the process delay of the web server 130 is 3.0 seconds, the process delay of the application server 140 is 2.9 seconds, and the process delay of the database server 150 is 1.8 seconds, whereby the TAT is estimated to be 10.7 seconds. Accordingly, while the performance requirements can be satisfied even in a case where the configuration at the time when the request arrival rate is 60 is applied until the request arrival rate becomes 70, the performance condition cannot be satisfied in a case where it is applied at a time when the request arrival rate is 75.

The policy changing unit 270 receives this result, generates a control policy that is adjusted as illustrated in FIG. 14 in accordance with the flow illustrated in FIG. 4, and stores the control policy in the practical policy storage unit 110. Since the adjusted control policy can respond to a higher request arrival rate with a low-cost configuration, the adjusted control policy is determined to be the optimal control policy by the policy changing unit 270.

In other words, according to this embodiment, in the test policy, the number of servers of at least one type of the web servers 130, the application servers 140, and the database servers 150 is set to be smaller than that in the practical policy. Then, the system control unit 260 measures a time (TAT) that is required for processing a unit amount. Then, the policy changing unit 270 changes the practical policy such that the number of servers of at least one type of the web servers 130, the application servers 140, and the database servers 150 decreases in a range in which the time required for processing the unit amount is equal to or shorter than a reference set in advance.

As above, while the embodiments of the present invention have been described with reference to the drawings, these are examples of the present invention, and thus various configurations other than those can be employed.

Priority is claimed on Japanese Patent Application No. 2010-048667, filed Mar. 5, 2010, the entire content of which is incorporated herein by reference.

The invention claimed is:

1. A control policy adjusting apparatus comprising:
a process history acquiring unit that acquires a history of processing performed by an information processing system;
a load information acquiring unit that sets load information representing a period dependency of the amount of processing required for the information processing system based on the history that is acquired by the process history acquiring unit;
a test period determining unit that sets a test period that is a period during which a test policy which is a policy for a test can be used out of control policies performed by the information processing system based on the load information;
a system control unit that measures performance capability of the information processing system under the test policy as a test result by testing the test policy under a production environment of the information processing system by using the test policy instead of a practical policy that is actually used in the test period; and
a policy changing unit that changes the practical policy based on the test policy in a range in which the test result satisfies a load reference.

2. The control policy adjusting apparatus according to claim 1,
wherein the information processing system includes a plurality of information processing apparatuses that perform the processing in parallel with each other, and
wherein the control policy sets the number of the information processing apparatuses that are operated.

3. The control policy adjusting apparatus according to claim 2,
wherein the test policy sets the number of the information processing apparatuses to be smaller than that of the practical policy,
wherein the system control unit measures a time that is required for the processing of a unit amount, and
wherein the policy changing unit changes the practical policy such that the number of the information processing apparatuses decreases in a range in which the time required for the processing of the unit amount is equal to or shorter than a reference set in advance.

4. The control policy adjusting apparatus according to claim 1, wherein the system control unit returns the test policy to the practical policy when the amount of the processing required for the information processing system exceeds a reference set in advance during a period in which the test is performed.

5. A method of adjusting a control policy comprising:
acquiring history of processing performed by an information processing system by using a computer;
setting load information that represents a period dependency of the amount of processing required for the information processing system based on the acquired history by using the computer;
setting a test period that is a period during which a test policy which is a policy for a test can be used out of control policies performed by the information processing system based on the load information by using the computer;
measuring performance capability of the information processing system under the test policy as a test result by testing the test policy under a production environment of the information processing system by using the test policy instead of a practical policy that is actually used in the test period by using the computer; and changing the practical policy based on the test policy in a range in which the test result satisfies a load reference by using the computer.

6. A non-transitory computer-readable recording medium for storing a program that makes a computer execute:

setting load information that represents a period dependency of the amount of processing required for the information processing system based on the acquired history;

setting a test period that is a period during which a test policy which is a policy for a test can be used out of control policies performed by the information processing system based on the load information;

measuring performance capability of the information processing system under the test policy as a test result by testing the test policy under a production environment of the information processing system by using the test policy instead of a practical policy that is actually used in the test period; and changing the practical policy based on the test policy in a range in which the test result satisfies a load reference.

\* \* \* \* \*